United States Patent
Mo et al.

(10) Patent No.: US 7,366,268 B2
(45) Date of Patent: Apr. 29, 2008

(54) SELECTIVE DATA INVERSION IN ULTRA-WIDE BAND COMMUNICATIONS TO ELIMINATE LINE FREQUENCIES

(75) Inventors: Shaomin S. Mo, Monmouth Junction, NJ (US); Alexander D. Gelman, Smallwood, NY (US); Jay Gopal, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 664 days.

(21) Appl. No.: 10/308,328

(22) Filed: Dec. 2, 2002

(65) Prior Publication Data

US 2004/0105515 A1 Jun. 3, 2004

(51) Int. Cl.
*H04L 7/00* (2006.01)
(52) U.S. Cl. ..................................... 375/354
(58) Field of Classification Search ............... 370/503, 370/505, 509, 510, 512, 513; 375/354, 365
See application file for complete search history.

(56) References Cited

U.S. PATENT DOCUMENTS

| | | | | |
|---|---|---|---|---|
| 3,831,142 A | * | 8/1974 | Fletcher et al. ............. | 714/789 |
| 5,349,611 A | * | 9/1994 | Varian ......................... | 375/367 |
| 5,636,279 A | * | 6/1997 | Katta et al. .................. | 380/217 |
| 5,881,074 A | * | 3/1999 | Rao ............................. | 714/786 |
| 5,999,571 A | * | 12/1999 | Shin et al. .................... | 375/292 |
| 6,192,093 B1 | * | 2/2001 | Lai et al. ..................... | 375/371 |
| 2002/0080824 A1 | * | 6/2002 | Wingrove ..................... | 370/509 |
| 2002/0114301 A1 | * | 8/2002 | Yee et al. .................... | 370/338 |
| 2003/0090977 A1 | * | 5/2003 | Schep et al. ............. | 369/53.21 |

FOREIGN PATENT DOCUMENTS

DE 101 10 676 A1 9/2002

\* cited by examiner

*Primary Examiner*—Khai Tran
(74) *Attorney, Agent, or Firm*—RatnerPrestia

(57) ABSTRACT

A method for generating an ultra-wide-band (UWB) having a reduced discrete frequency component defines frame synchronization signal and an inverted frame synchronization signal. As each frame is generated, the method randomly selects the frame synchronization signal or the inverted frame synchronization signal to be included with the frame. The frame synchronization signal is detected by a correlator and the magnitude of the correlation is used to indicate the detection of the frame synchronization signal.

6 Claims, 3 Drawing Sheets

SELECTIVE DATA INVERSION IN ULTRA-WIDE BAND COMMUNICATIONS TO ELIMINATE LINE FREQUENCIES

The present invention is concerns Ultra Wide-Band transmission technology and, in particular, a method for modifying data transmitted in an Ultra Wide-Band transmission system to reduce discrete frequency components.

Ultra Wide-Band (UWB) technology has been used for military applications for many years. Applications outside of the military will soon become possible due to a rule announced by the Federal Communications Commission (FCC) that permits the marketing and operation of certain new types of consumer products incorporating UWB technology.

UWB technology uses base-band pulses of very short duration to spread the energy of the radio signal very thinly from near zero to several GHz. The techniques for generating UWB signals are well known.

The key motivation for the FCC's new decision to allow commercial applications is that no new spectrum is required for UWB transmissions because, when they are properly configured, UWB signals can coexist with other applications in the same spectrum with negligible mutual interference. In order to ensure negligible mutual interference, however, the FCC has specified emission limits for the UWB applications. A basic FCC requirement is that UWB systems do not generate signals that interfere with other narrowband communication systems.

The emission profile of a UWB signal can be determined by examining its power spectral density (PSD). The PSD for ideal synchronous data pulse streams based upon stochastic theory is well documented in the literature. Characterization of the PSD of the Time-Hopping Spread Spectrum signaling scheme in the presence of random timing jitter using a stochastic approach is in an article by Moe et al. entitled "On the Power Spectral Density of Digital Pulse Streams Generated by M-ary Cyclostationary Sequences in the Presence of Stationary Timing Jitter." IEEE Tran. on Comm., Vol. 46, no. 9, pp. 1135-1145, Sep. 1998. According to this research, power spectra of UWB signals consist of continuous and discrete components. The continuous component behaves like white noise and has less effect on narrowband communication systems than the discrete component. Thus a basic objective in the design of UWB systems is to reduce the discrete component of the UWB power spectrum.

UWB technology has many potential applications in networking and communications, as well as in radar. Multiple access systems such as current cellular systems and wireless personal network systems (e.g. PAN systems) commonly use frame synchronization. Frame synchronization uses a string of predefined pattern of bits, called 'sync word', at the beginning of a frame to allow the receiver to synchronize its clock signal to the clock signal used to transmit the data. In many wireless systems, especially in quality-of-service (QoS) guaranteed multimedia systems such as audio/video systems, the length of the frame is fixed for simplicity of implementation.

As described below, however, using a fixed frame length with a predefined sync word in a UWB system may generate a strong discrete component in the PSD of UWB signal.

SUMMARY OF THE INVENTION

The invention is embodied in a method for generating a pulse signal that is modulated by a data signal including at least one repetitive data pattern. The modulated signal has a reduced discrete frequency component resulting from the repetitive data pattern. The method locates instances of the repetitive pattern in the data signal and randomly inverts ones of the instances before modulating the pulse signal with the modified data signal. According to one aspect of the invention, the repetitive bit pattern is a frame synchronization word.

According to one aspect of the invention, the repetitive data pattern is a frame synchronization word.

According to another aspect of the invention, the data signal is divided into blocks and the repetitive data pattern is contained within ones of the blocks and the method inverts randomly selected blocks of the data signal.

DETAILED DESCRIPTION

In order to understand the operation of the invention, it is helpful to understand the Power of Spectral Densities (PSDs) of a clocked random sequence and of sync words used with fixed frame length data.

The PSD of a clocked random sequence may be used to model the PSD of an ideal data transmission. Assume that a digitally controlled signal is used that produces random transmissions at multiples of a basic clock period Tc. This signaling technique, known as clocked Time Hopping by a random sequence is shown in FIG. 1 and is modeled as shown in equation (1).

$$s(t) = \sum_{n=-\infty}^{\infty} a_n w(t - nTc - \varepsilon_n) \quad (1)$$

where $\{a_n\}$ is an unbalanced binary independent identically distributed (i.i.d.) random sequence and $\{\epsilon_n\}$ represents the random timing jitter. It is assumed that $(a_n)$ and $\epsilon_n$ are stationary and mutually independent.

Figure 1:
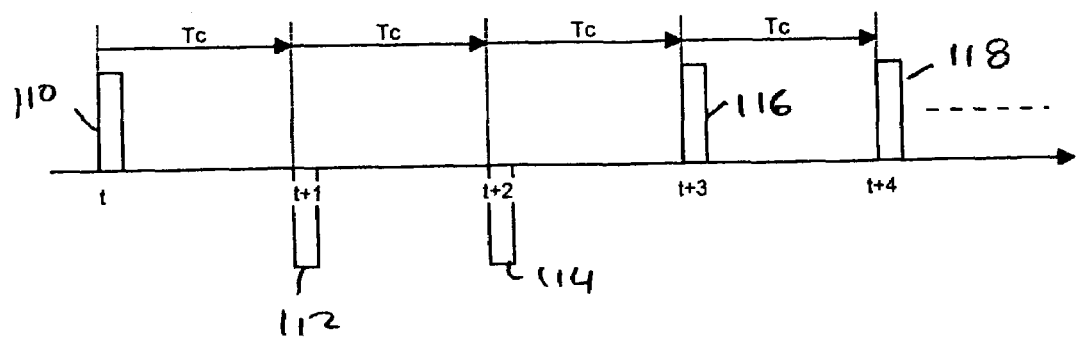
FIG. 1 is signal pulse diagram that is useful for describing UWB signals that employ bi-polar or bi-phase modulation.

As shown in FIG. 1, the transmissions 110, 112, 114, 116 and 118 having leading-edges that are separated by Tc seconds. Transmissions 110, 116 and 118 have a positive polarity (+1) while transmissions 112 and 114 have a negative polarity (−1).

The probability function of $\{a_n\}$ may be represented by equation (2).

$$Pr\{a_n\} = \begin{cases} p, & a_n = 1 \\ 1-p, & a_n = -1 \end{cases} \quad (2)$$

For an independent stationary stochastic sequence $\{\epsilon_n\}$, it has been shown that the continuous and discrete components may be modeled in the frequency domain as shown in equations (3) and (4).

$$S^c(f) = \frac{1}{Tc}|W(f)|^2\{1 - (2p-1)^2|\Phi_{\epsilon_n}(f)|^2\} \quad (3)$$

$$S^d(f) = \frac{(2p-1)^2}{Tc^2}\sum_{l=-\infty}^{\infty}\left|W\left(\frac{l}{Tc}\right)\right|^2\left|\Phi_{\epsilon_n}\left(\frac{l}{Tc}\right)\right|^2\delta_D\left(f - \frac{l}{Tc}\right) \quad (4)$$

where $$\phi_{\epsilon_n}(y) = E\{e^{j2\pi y \epsilon_n}\}$$

and $$y = \frac{l}{Tc}.$$

Equations (3) and (4) are the components of PSD of a clocked random sequence signal in the presence of arbitrary stationary timing jitter. If it is assumed that the jitter term is zero, (i.e. n=0) the above equations (3) and (4) can be simplified to equations (5) and (6).

$$S^c(f) = \frac{1}{Tc}|W(f)|^2\{1 - (2p-1)^2\} \quad (5)$$

$$S^d(f) = \frac{(2p-1)^2}{Tc^2}\sum_{l=-\infty}^{\infty}\left|W\left(\frac{l}{Tc}\right)\right|^2\delta_D\left(f - \frac{l}{Tc}\right) \quad (6)$$

These equations may be further simplified by defining functions to represent some of the claim terms as shown in equations (7), (8), (9) and (10).

$$A(f) = \frac{1}{Tc}|W(f)|^2 \quad (7)$$

$$B(f) = \frac{1}{Tc^2}\sum_{l=-\infty}^{\infty}\left|W\left(\frac{l}{Tc}\right)\right|^2\delta_D\left(f - \frac{l}{Tc}\right) \quad (8)$$

$$C(p) = (2p-1)^2 \quad (9)$$

$$D(p) = 1 - (2p-1)^2 \quad (10)$$

Using these terms, equation (5), representing $S^c(f)$, and equation (6), representing $S^d(f)$, can be further simplified as shown in equations (11) and (12).

$$S^c(f,p) = A(f)D(p) \quad (11)$$

$$S^d(f,p) = B(f)C(p) \quad (12)$$

Figure 2:
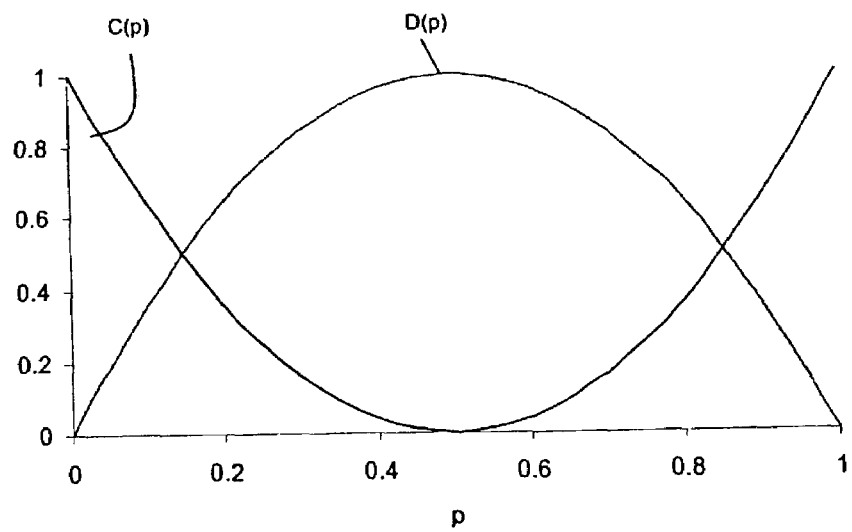
FIG. 2 is a graph of the functions C(p) and D(p) versus probability.

FIG. 2 is a graph of the functions C(p) and D(p) versus probability, p. It is noted that the following relationships hold, based on these graphs, max C(p)=C(0)=C(1)=1, min C(p)=C(0.5)=0; max D(p)=D(0.5)=1, min D(p)=D(0)=D(1)=0

Based on above results, the following relationships may be derived:

$S^c(f,0)=0$ and $S^d(f, 0)=B(f)$ when p=0.

In this case, $S^d(f)$ is at its maximum value and all of the energy of the signal is in the discrete component no matter what waveform is used for pulses;

$S^c(f, 1)=0$ and $S^d(f, 1)=B(f)$ when p=1.

In this case also, $S^d(f)$ reaches maximum and all of the energy of the signal is in the discrete component no matter what waveform is used for pulses;

$S^c(f, 0.5)=A(f)$ and $S^d(f, 0.5)=0$ when p=0.5.

In this case, $S^c(f)$ reaches maximum and all of the energy of the signal is in the continuous component no matter what waveform is used for pulses.

From the above analysis, we can see that if the total PSD remains the same, the distribution of the random sequence will determine the distribution of the PSD between the continuous and discrete components. If the random sequence has equal probabilities of positive and negative polarity values, all of the energy of the signal is in the continuous component.

Now it is useful to examine the relationship between A(f) and B(f). Because the total PSD is the same for p=0 and p=0.5, i.e., S(f, 0)=S(f, 0.5), we have the relationship given by equations (13), (14) or (15).

$$A(f)=B(f) \quad (13)$$

or $$\frac{1}{Tc}|W(f)|^2 = \frac{1}{Tc^2}\sum_{l=-\infty}^{\infty}\left|W\left(\frac{l}{Tc}\right)\right|^2\delta_D\left(f - \frac{l}{Tc}\right) \quad (14)$$

or $$|W(f)|^2 = \frac{1}{Tc}\sum_{l=-\infty}^{\infty}\left|W\left(\frac{l}{Tc}\right)\right|^2\delta_D\left(f - \frac{l}{Tc}\right) \quad (15)$$

From equation (15) the following can be seen that:

The total PSD on the left side of the equation (i.e. the continuous component) is equal to the total PSD on the right side (i.e. the discrete component);

The PSD on the left is distributed over all frequencies while the PSD on the right side is distributed only on those discrete frequencies separated by 1/Tc. This means that the PSD on the left side is more widely distributed than the PSD on the right side;

Because of above two facts, the magnitude on left side of equation (15) is less than the magnitude on the right side.

Another explanation of the above statement is that on the right side of equation (15), there is a scaling factor of 1/Tc. With high frame rate, Tc<<1 second, which means the magnitude on the right side is larger than that on the left side.

From the above analyses, it can be seen that a good design is to reduce or eliminate discrete component of PSD. In the exemplary embodiment of the invention p is chosen to be 0.5. Consequently, all energy goes into continuous component.

Figure 3:
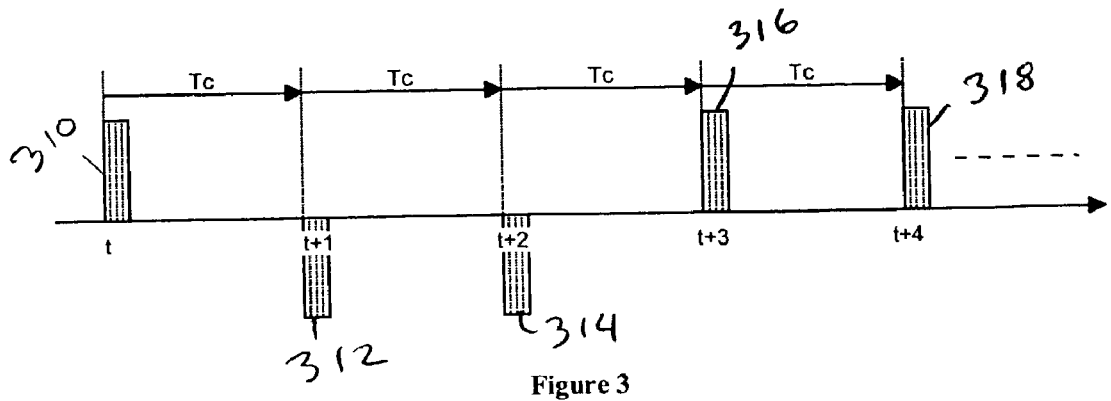
FIG. 3 is a signal pulse diagram that is useful for describing the application of the invention to the frame synchronization pulses of UWB signals.

Based on the above theoretical analysis, a method may be devised to reduce the discrete component caused by the frame synchronization pattern (sync word) of a UWB signal having a fixed frame length. In current wireless implementations, sync words are usually transmitted at multiples of the basic clock period Tc. In FIG. 3, for example, only the sync words 310, 312, 314, 316 and 318 are shown. The frames corresponding to these sync words are omitted. In this example, the sync words occur at intervals of Tc Each of the sync words 310, 312, 314, 316 and 318 consists of several bits or symbols. It is noted that some of the sync words (310, 316 and 318) have a positive polarity while other sync words (312 and 314) have a negative polarity.

Each of the exemplary sync words consists of L symbols and symbol time is denoted by Tb. Similar to the previous example, a generic model of sync word is given by equation (16)

$$s_s(t) = \sum_{n=-\infty}^{\infty} \sum_{l=0}^{L-1} a_{n,l} w(t - nTc - lTb) \quad (16)$$

Because a sync word usually has fixed pattern as shown in equation (17), $$a_{n,l} = b_l a_{n,0} \quad (17)$$

and bls have fixed values as shown in equation (18), $$b_l = \begin{cases} 1, & l = 0 \\ 1/-1, & \text{otherwise} \end{cases} \quad (18)$$

The sync word model can be changed to that shown by equation (19).

$$s_s(t) = \sum_{n=-\infty}^{\infty} \sum_{l=0}^{L-1} a_{n,l} w(t - nTc - lTb) \quad (19)$$
$$= \sum_{n=-\infty}^{\infty} a_{n,0} \sum_{l=0}^{L-1} b_l w(t - nTc - lTb)$$

Defining the terms cn and ws(t-nTc) as shown in equations (20) and (21)

$$c_n = a_{n,0} \quad (20)$$

$$w_s(t - nTc) = \sum_{l=0}^{L-1} b_l w(t - nTc - lTb) \quad (21)$$

allows the sync word model to be further changed to that shown in equation (22).

$$s_s(t) = \sum_{n=-\infty}^{\infty} c_n w_s(t - nTc) \quad (22)$$

If two sync words SYNC and $\overline{SYNC}$ are used and they take opposite values at the corresponding bits, their probability function can be described by equation (23)

$$Pr\{s\} = \begin{cases} p, & c_n = 1 \quad (s = SYNC) \\ 1-p, & c_n = -1 \quad (s = \overline{SYNC}) \end{cases} \quad (23)$$

Then as in the analyses of the Clocked Random Sequence, the continuous and discrete components may be represented in the frequency domain as shown in equations (24) and (25)

$$S_s^c(f,p) = A(f)\{1-(2p-1)^2\} \quad (24)$$

$$S_s^d(f,p) = B(f)(2p-1)^2 \quad (25)$$

where the term Ws(f) in the functions A(f) and B(f) is the PSD of the sync word.

As in the analyses of the Clocked Random Sequence, if p is chosen to be 0.5, the following relationship holds.

$$S^c(f, 0.5) = A(f) \text{ and } S^d(f, 0.5) = 0.$$

In this case, $S^c(f)$ reaches maximum and all energy goes to continuous component no matter what waveform is used for pulses. Based on the above analysis of the PSD of multiple sync words, the following mechanism is proposed for frame synchronization:

1. Modulation of the UWB signal is bi-polar or bi-phase where the different polarities or phases have the same magnitude but different sign;
2. Two sync words are used in frame synchronization;
3. The two sync words have the same length and corresponding bits of the two sync words have opposite values;
4. One of the sync words is chosen in one frame, which is controlled by a random sequence $\{b_n\}$ with an evenly distributed function given by equation (26)

$$Pr\{b_n\} = \begin{cases} 0.5, & b_n = 1 \\ 0.5, & b_n = -1 \end{cases} \quad (26)$$

In performing above processing, a sequence $\{a_n\}$ is combined with a control sequence $\{b_n\}$ using an exclusive-or (XOR) operation. Thus a new sequence $\{c_n\}$ is produced as shown in equation (27).

$$s_s(t) = \sum_{n=-\infty}^{\infty} c_n w(t - nT_c) \quad (27)$$

where $C_n = a_n \oplus b_n$.

The probability functions of $\{a_n\}$ and $\{b_n\}$ are given by equations (28) and (29)

$$Pr\{a_n\} = \begin{cases} p, & a_n = 1 \\ 1-p, & a_n = -1 \end{cases} \quad (28)$$

$$Pr\{b_n\} = \begin{cases} 0.5, & b_n = 1 \\ 0.5, & b_n = -1 \end{cases} \quad (29)$$

The XOR operation is shown in the table 1:

TABLE 1

| $a_n$ | $b_n$ | $c_n$ |
|---|---|---|
| 1 | 1 | −1 |
| 1 | −1 | 1 |
| −1 | 1 | 1 |
| −1 | −1 | −1 |

The probability of $\{c_n\}$ can be obtained as shown in equation (30)

$$Pr\{c_n=1\}=Pr\{a_n=1,b_n=-1\}+Pr\{a_n=-1,b_n=1\} \qquad (30)$$

Because $\{a_n\}$ and $\{b_n\}$ are independent, equation (30) becomes $$Pr\{c_n = 1\} = Pr\{a_n = 1\}Pr\{b_n = -1\} + Pr\{a_n = -1\}Pr\{b_n = 1\}$$
$$= p*0.5 + (1-p)*0.5$$
$$= 0.5$$

Similarly the probability that $c_n$ is negative 1 is, $$Pr\{c_n = -1\} = Pr\{a_n = 1\}Pr\{b_n = 1\} + Pr\{a_n = -1\}Pr\{b_n = -1\}$$
$$p*0.5 + (1-p)*0.5$$
$$0.5$$

Therefore the probability function of $\{c_n\}$ is given by equation (31)

$$Pr\{c_n\} = \begin{cases} 0.5, & c_n = 1 \\ 0.5, & c_n = -1 \end{cases} \qquad (31)$$

In doing this, a unbalanced sequence becomes balanced sequence and energy from the sync words is transferred from the discrete component to the continuous component of the PSD.

As described above with reference to equation (19), the sync word may be modeled as:

$$s_s(t) = \sum_{n=-\infty}^{\infty} \sum_{l=0}^{L-1} \bar{a}_{n,l} w(t - nTc - lTb) \qquad (19)$$

after applying the scheme described above in which selected sync words are randomly inverted in polarity responsive to the random sequence $b_n$, described above with reference to equation (26), the transmitted signal may be represented by equation (32).

$$s_s(t) = \sum_{n=-\infty}^{\infty} b_n \sum_{l=0}^{L-1} \bar{a}_{n,l} w(t - nTc - lTb) \qquad (32)$$

At time instant n, the received signal can be represented by equation (33).

$$r(n) = b_n \sum_{l=0}^{L-1} \hat{a}_{n,l} \qquad (33)$$

where $\hat{a}_{n,l}$ is the estimate of $\bar{a}_l$ that is the element of the sync word is $\bar{a}=(\bar{a}_0, \ldots, \bar{a}^{L-1})$. Assume $\hat{a}_{n,l}$ may have values (1, −1). Synchronization in base-band is done by finding the sync word. This is typically done by sliding a correlation window consisting of $\bar{a}$ through the received data r(n) and calculating correlation function at each time instant. If the sliding window is at the right place, the following correlation operation may be described by equation (34) which reduces to equation (35) when the received data is aligned with the correlation window.

$$I(n) = r(n) \cdot \bar{a} = b_n \sum_{l=0}^{L-1} \hat{a}_{n,l} \bar{a}_l \qquad (34)$$

$$= b_n * L \qquad (35)$$

where $b_n$ is either 1 or −1. Therefore, sync word is said detected when I(n) reaches either maximum or minimum. In other words, if the magnitude of I(n) gets maximum, the sync word is said found.

If the signal in the base-band is a sampled pulse shape instead of (1, −1), the template for correlation will use data of sampled pulse shape for correlation calculation. Criterion for detection remains the same.

Figure 4A:
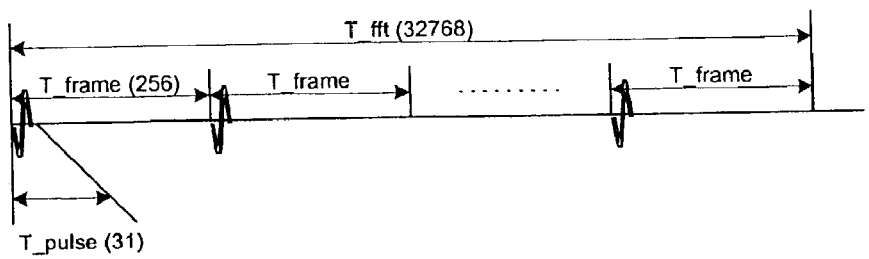
FIGS. 4A and 4B are signal diagrams that are useful for describing a simulation of the present invention.
Figure 4B:
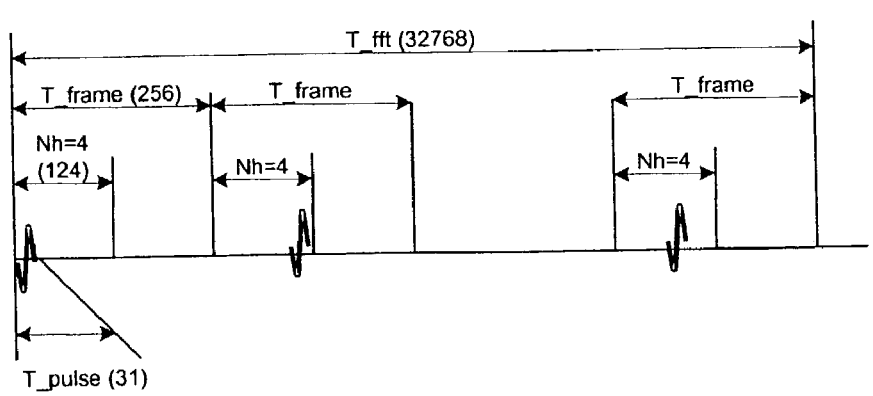

FIGS. 4A and 4B show a simulated signal that may be used to evaluate the inventive method. The results of the simulation are shown in FIGS. 5A through 5F. The simulation uses Periodogram PSD estimators to calculate the PSD of different UWB signals. The simulation is configured as follows: the single pulse 400 is represented by 31 samples and frame size T_frame occupying a time interval, Tc, includes 256 samples. A fast-Fourier transform (FFT) operation having 32768-points is used on 32768 samples of the UWB signal to evaluate its PSD. Because a single estimate may be subject to a large estimation bias and the because the FCC regulation sets a limit on the average PSD, 500 estimates of PSD are used to smooth the PSD estimate.

Figure 5A:
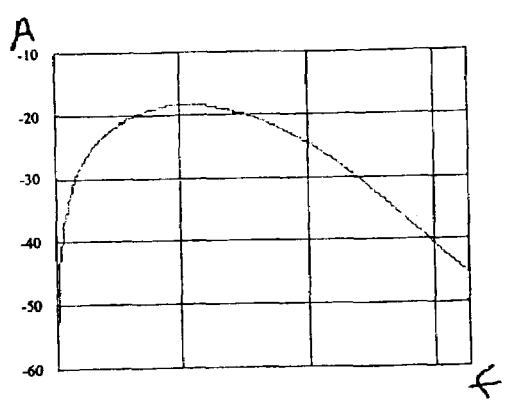
FIGS. 5A, 5B, 5C, 5D, 5E and 5F are graphs of frequency versus amplitude that are useful for describing the results of the simulations.
Figure 5B:
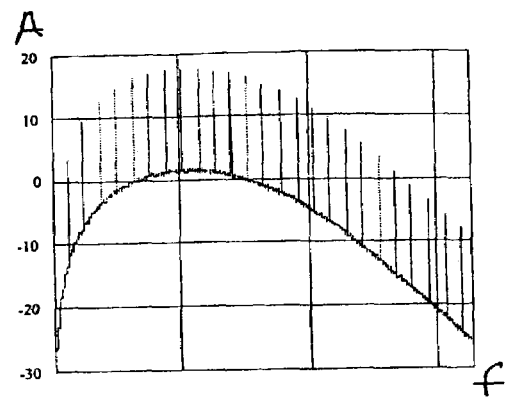
Figure 5C:
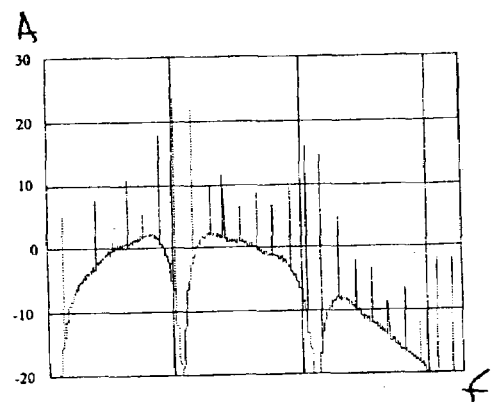
Figure 5D:
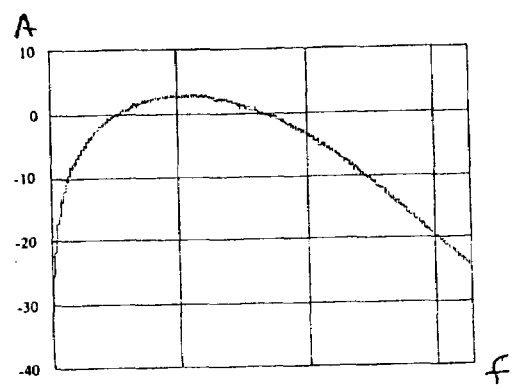
Figure 5E:
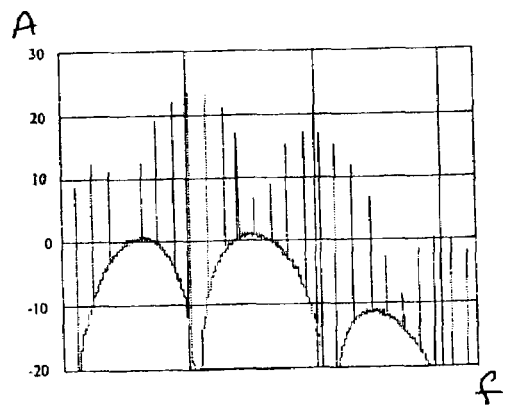
Figure 5F:
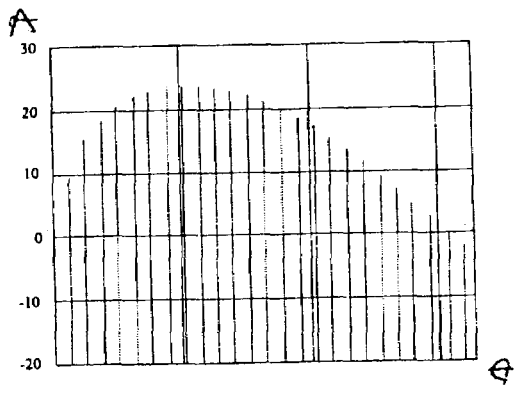

The results of the simulation are shown in FIGS. 5A through 5F. FIG. 5A shows the PSD of one pulse, FIG. 5C shows the PSD of pulses of Time-Hopping with possible hop times Nh=4. FIG. 5E shows the PSD of pulses of Time-Hopping with possible hop times Nh=2, FIG. 5B shows the PSD of bi-phase pulses with a probability p=0.25, FIG. 5D shows the PSD of bi-phase pulses with probability p=0.5 and FIG. 5F shown the PSD of bi-phase pulses with probability of p=1.0. Indeed, FIG. 5F also illustrates the PSD of a Time-Hopping signal with hop times Nh=1.

The results show that

Using time-hopping, the more the hop times, the smoother the PSD, shown in FIGS. 5C, 5E and 5F. However, amplitude of the peak frequency is almost same, about 23 dB. And more hop times means low channel usability. Reducing PSD and increasing channel capacity are conflicting.

Using bi-phase pulses, when p=1.0 or 0.0, only discrete components exists shown in FIG. 5F and when p=0.5, only continuous components exists, as shown in FIG. 5D. In between, both continuous and discrete components exist, as shown in FIG. 5B.

Using bi-phase pulses, when p=1.0 or 0.0, the amplitude of the peak frequency reaches maximum, about 23 dB, as shown in FIG. 5F and when p=0.5, the amplitude of the peak frequency is at a minimum, about 3 dB shown in FIG. 5D.

The PSD of bi-phase pulses with p=0.5 has the minimum peak frequency amplitude compared to that in other cases, and is about 20 dB lower than for Time-Hopping.

The above results show that the proposed mechanism, represented by FIG. 5D, can reduce the PSD of UWB signals. It has better performance and is easier to implement than the time-hopping technique.

The implementations described above have focused on particular repetitive data, the sync word, that occurs in UWB communications. UWB communications typically employ Pulse Position Modulation (PPM) in publications. These signals may have repetitive elements that are not confined to the sync word. Time Hopping has been proposed to reduce or eliminate the discrete component of the PSD of these UWB signals. As described above, however, Time-Hopping may be difficult to implement, in the context of multiple access communications systems, especially wireless Ad Hoc networks.

Based on above analysis of the PSD of multiple sync words, it can be seen that the same principle may be applied to the payload data to reduce the discrete component of PSD that may be caused by the repetitive nature of the data. Therefore, following mechanism is proposed for payload data:

1. Modulation is in bi-polar or bi-phase form with the two polarities or phases having the same magnitude but different signs;
2. All of the data in one block take either the original value or take the opposite (inverted) value, which is controlled by a random sequence $\{b_n\}$ defined in section 3.2;
3. One bit is used in the data block to indicate whether the data in the block is inverted.

As in the analysis of frame synchronization, all energy goes to continuous component of the PSD.

The present invention concerns a mechanism to reduce or eliminate the discrete component of PSD of a UWB signal that is related to the repetitive occurrence of frame synchronization words. The invention also extends this concept to payload data. The implementation described for the present invention is easier than Time Hopping and it may be used in UWB multiple access communications and Ad-hoc networks.

The present invention has been described in terms of exemplary embodiments. It is contemplated, however, that it may be practiced as described above, within the scope of the following claims.

The invention claimed is:

1. A method for generating a pulse signal modulated by a data signal including at least one repetitive data pattern, wherein the modulated signal has a reduced discrete frequency component resulting from the repetitive data pattern, the method comprising the steps of:

locating instances of the repetitive pattern in the data signal before the data signal is used to modulate the pulse signal;

randomly inverting ones of the located instances to form a modified data signal; and modulating the pulse signal with the modified data signal.

2. A method for generating a pulse signal modulated by a data signal including at least one repetitive data pattern, wherein the modulated signal has a reduced discrete frequency component resulting from the repetitive data pattern, the method comprising the steps of:

locating instances of the repetitive pattern in the data signal before it is used to modulate the pulse signal;

randomly inverting ones of the instances to form a modified data signal; and modulating the pulse signal with the modified data, wherein the pulse signal is an ultra-wide-band (UWB) signal including a plurality of frames and the repetitive data pattern is a frame synchronization signal occurring at a predetermined position in each of the frames, wherein the step of randomly inverting ones of the instances includes the steps of:

defining a frame synchronization signal and an inverted frame synchronization signal;

as each frame is generated, selecting a respective datum from a random data-stream, the selected datum having substantially equal probability of having a first value or a second value; and assigning the frame synchronization signal to the frame if the respective selected datum has the first value and assigning the inverted frame synchronization signal to the frame if the selected datum has the second value.

3. A method for generating a pulse signal modulated by a data signal including at least one repetitive data pattern, wherein the modulated signal has a reduced discrete frequency component resulting from the repetitive data pattern, the method comprising the steps of:

locating instances of the repetitive pattern in the data signal before it is used to modulate the pulse signal;

randomly inverting ones of the instances to form a modified data signal; and modulating the pulse signal with the modified data signal, wherein the repetitive data pattern occurs throughout the data signal and the step of locating instances of the repetitive bit pattern includes the steps of:

dividing the data signal into blocks;

as each block is generated, selecting a respective datum from a random data-stream, the selected datum having substantially equal probability of having a first value or a second value, and inverting the generated block if then respective selected datum has the first value and passing the generated block unchanged if the selected datum has the second value.

4. A method for generating a pulse signal modulated by a data signal including at least one repetitive data pattern, wherein the modulated signal has a reduced discrete frequency component resulting from the repetitive data pattern, the method comprising the steps of:

locating instances of the repetitive pattern in the data signal before it is used to modulate the pulse signal;

randomly inverting ones of the instances to form a modified data signal; and modulating the pulse signal with the modified data signal, wherein the repetitive data pattern occurs throughout the data signal and the step of locating instances of the repetitive bit pattern includes the steps of:

dividing the data signal into blocks;

as each block is generated, selecting a respective datum from a random data-stream, the selected datum having substantially equal probability of having a first value or a second value, and inverting the generated block if then respective selected datum has the first value and passing the generated block unchanged if the selected datum has the second value, wherein the pulse signal is an ultra-wide-band (UWB) signal.

5. A method for generating an ultra-wide-band (UWB) signal including a plurality of frames each frame including a frame synchronization signal, the method including the steps of:

defining a frame synchronization signal and an inverted frame synchronization signal;

as each frame is generated, selecting a respective datum from a random data-stream, the selected datum having substantially equal probability of having a first value or a second value;

assigning the frame synchronization signal to the frame if the respective selected datum has the first value and assigning the inverted frame synchronization signal to the frame if the selected datum has the second value.

6. A method for generating an ultra-wide-band (UWB) signal including a plurality of frames each frame including a frame synchronization signal, the method including the steps of:

defining a frame synchronization signal and an inverted frame synchronization signal;

as each frame is generated, selecting a respective datum from a random data-stream, the selected datum having substantially equal probability of having a first value or a second value;

assigning the frame synchronization signal to the frame if the respective selected datum has the first value and assigning the inverted frame synchronization signal to the frame if the selected datum has the second value; and detecting the frame synchronization signal, wherein the step of detecting the frame synchronization signal includes the steps of:

correlating the frame synchronization signal with the UWB signal to generate a correlation signal having a magnitude and a polarity; and indicating that the frame synchronization signal has been detected responsive to the magnitude of the signal generated by the magnitude of the correlation signal.

\* \* \* \* \*